United States Patent
Bitelli

[19]

[11] Patent Number: 6,126,227
[45] Date of Patent: Oct. 3, 2000

[54] COVERING STRUCTURE OF THE DRIVING PLACE OF OPERATIVE MACHINES

[75] Inventor: Romolo Bitelli, S. Lazzaro, Italy

[73] Assignee: Bitelli SPA, Minerbio, Italy

[21] Appl. No.: 09/131,207

[22] Filed: Aug. 7, 1998

[30] Foreign Application Priority Data

Sep. 26, 1997 [IT] Italy .................................. VI97A0167

[51] Int. Cl.$^7$ ...................................................... B60J 7/00
[52] U.S. Cl. .............................. 296/107.03; 296/190.03; 280/756
[58] Field of Search ........................ 296/190.03, 190.08, 296/190.11, 102, 105, 121, 122, 107.03, 107.16, 107.17, 26.07, 100.1; 135/88.01, 88.03; 280/756

[56] References Cited

U.S. PATENT DOCUMENTS

| | | | |
|---|---|---|---|
| 2,596,903 | 5/1952 | Kropp | 296/190.11 |
| 2,795,458 | 6/1957 | Wieschel | 296/190.11 X |
| 3,575,460 | 4/1971 | Kennedy | 296/26.07 X |
| 3,924,889 | 12/1975 | Gogush | 296/26.07 X |
| 4,173,371 | 11/1979 | Kopas | 296/190.03 |
| 4,202,565 | 5/1980 | Mosch | 296/102 X |
| 4,366,979 | 1/1983 | Pillot | 296/26.07 X |
| 4,981,319 | 1/1991 | Gerzeny et al. | 296/26.07 |
| 5,016,858 | 5/1991 | Mitchell | 296/26.07 X |
| 5,842,732 | 12/1998 | Daggett et al. | 296/102 |

FOREIGN PATENT DOCUMENTS

| | | | |
|---|---|---|---|
| 2557040 | 6/1985 | France | 296/190.08 |
| 402216375 | 8/1990 | Japan | 296/190.08 |

*Primary Examiner*—Joseph D. Pape
*Attorney, Agent, or Firm*—Dykema Gossett

[57] ABSTRACT

The invention realizes a covering structure of the driving place of operative machines for road-works comprising a canopy which insists on the frame of said operative machine by supporting elements and shifting mechanisms suitable for lifting it. Each of said supporting elements is formed of at least a couple of traces made movable by at least one of the shifting mechanisms which is arranged between them and which realizes their compass movement in order to lift said canopy. When said canopy is lifted, said braces are arranged in an angular position according to an angle of an amplitude wider than 180°, suitable for favoring its filling when said canopy is lowered.

6 Claims, 6 Drawing Sheets

COVERING STRUCTURE OF THE DRIVING PLACE OF OPERATIVE MACHINES

BACKGROUND OF THE INVENTION

The invention concerns a covering structure of the driving place of operative machines, particularly suitable for executing road-works.

It is known that the driving place of operative machines for road-works is protected by a covering structure in order to protect the driver during the use of the machine.

The covering structures belonging to the known technique which are commonly used, are formed of a canopy which insists on the frame of the operative machine by supporting telescopic elements which permit its lifting and lowering by manual manuvres.

Solutions of this kind present therefore manoeuvring problems because the manual lifting and lowering of the canopy is quite uneasy, first of all when it presents considerable dimensions and weights.

Besides, when the canopy is of large dimensions it is easy that during the lifting and the lowering it arranges itself in an inclined position, forcing in an oblique way on the telescopic supporting elements and obliging the operator to intervene in order to unfix it.

Another inconvenience is also wherein the lifting of the canopy, beginning from its position completely lowered, takes place inside the driving place and for entering it the operator is obliged to slip in under the canopy and therefore to make movements in uneasy conditions which could sometimes involve the danger of work accidents.

In order to obviate to such inconveniences, covering structures in which the canopy is provided with articulated supporting elements which are pushed by actuators with compressed gas, are known.

Such solutions present however problems for the closing of the canopy similar to the problems previously mentioned.

Indeed if the presence of actuators with compressed gas makes easy the lifting of the canopy which takes place in an automatic way by thrust of the actuators themselves, it should be manually lowered in order to be closed again, and therefore the same problems previously described, and that is the canopy can fix itself in an oblique way forcing against the elements which support it, could arise again.

The present patent intends to overcome the mentioned inconveniences.

In particular one of the purposes of the invention is for realising a covering structure of the driving place of operative machines for road-works which doesn't present difficulties for being lowered and lifted.

It is another purpose for the covering structure of the invention is not subjected to warp or incline itself pushing in an oblique way against the supporting elements and therefore to block itself when it is lowered.

It is another purpose for the canopy which forms the covering structure of the invention can be easily manoeuvred by the outside of the machine before the operator slips in the driving place.

The mentioned purposes are achieved by the realisation of a covering structure of the driving place of operative machines which, according to the main claim, comprises a canopy which insists on the frame of said operative machine by supporting elements and shifting means suitable for lifting it and it is wherein each of said supporting elements is formed by at least a couple of braces made movable by at least one of said shifting means, which is arranged between them and which has its compass movement in order to lift said canopy, being said braces, when said canopy is lifted, arranged in an angular position according to an amplitude angle smaller than 180°, suitable for favouring their folding when said canopy is lowered.

According to a preferred embodiment the canopy, which presents in plan a substantially rectangular shape is supported in correspondence with the vertexes by supporting elements which are formed of an upper rod rotatably secured or pivoted to the frame of said machine, where the clear extremities of said upper and lower rods are pivoted to one another. An hydraulic cylinder for the lifting and the lowering of said canopy is arranged in between said upper and lower rods.

Said hydraulic cylinders are fed by a same pressurised circuit by which the canopy is lifted when said hydraulic cylinders are fed by pressurised oil and vice-versa it is lowered when said hydraulic cylinders are put for draining by suitable command valves.

Advantageously the commanding device of the power of the hydraulic circuit which feeds said hydraulic cylinders can be activated not only from the driving place but also from the outside of the operative machine in order that the operator can lift the canopy before entering the driving place.

Advantageously, when the canopy is in a completely lifted position, the rods which are the supporting elements are in an angular position in order to favour the descending of the canopy itself which keeps itself in a plane position during the lowering, avoiding this way its arrangement in an oblique position and its forcing against the supporting elements, fixing itself.

BRIEF DESCRIPTION OF THE DRAWINGS

The mentioned purposes and advantages will be better pointed out during the description of a preferred embodiment given as an example but not as a restriction and represented in the enclosed drawings where:

FIG. 2 shows the covering structure of the invention in a close side view applied to the frame of the operative machine;

DESCRIPTION OF THE INVENTION

Figure 1:
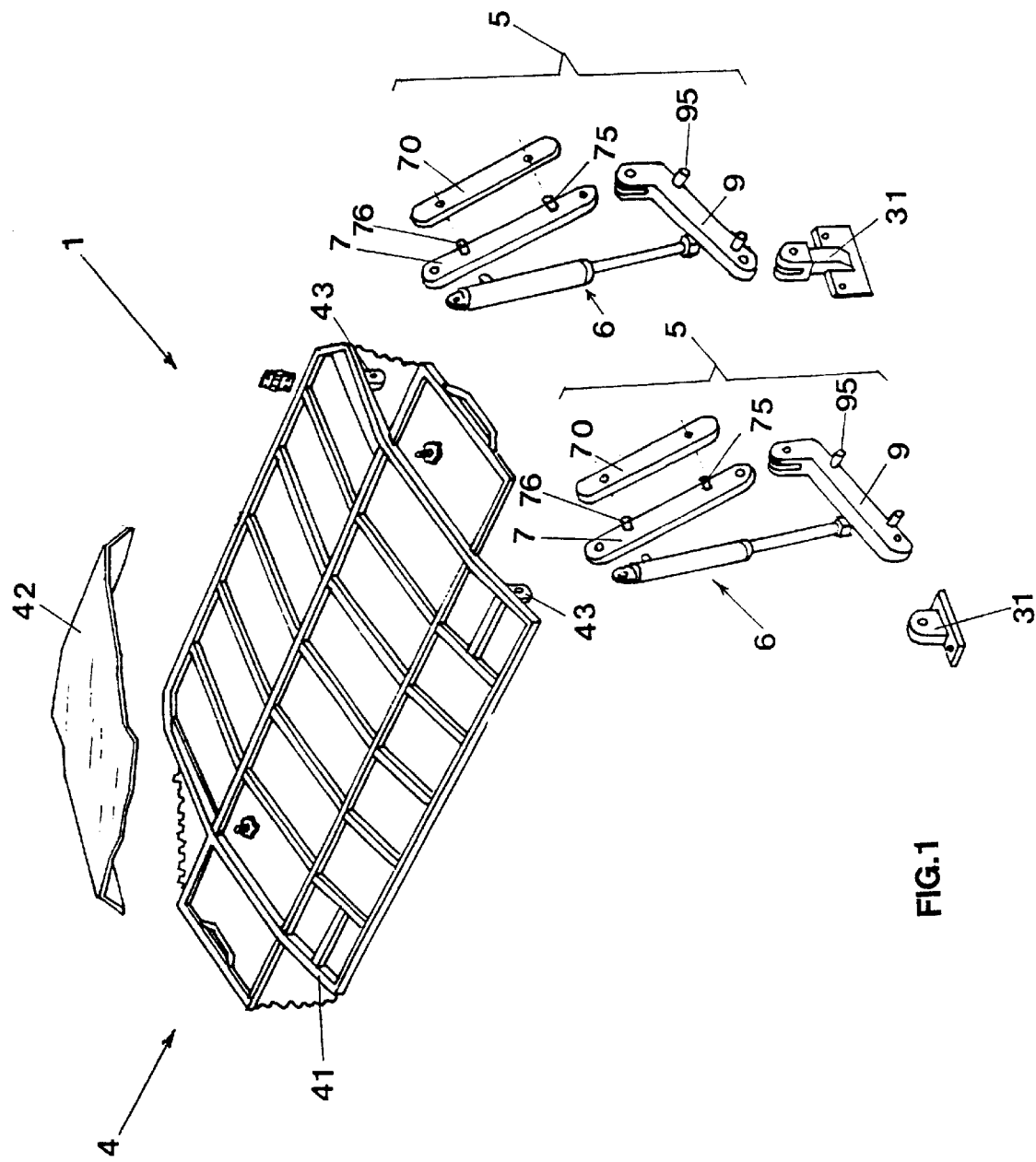
FIG. 1 shows the covering structure of the invention in an exploded axionometric representation.
Figure 2:
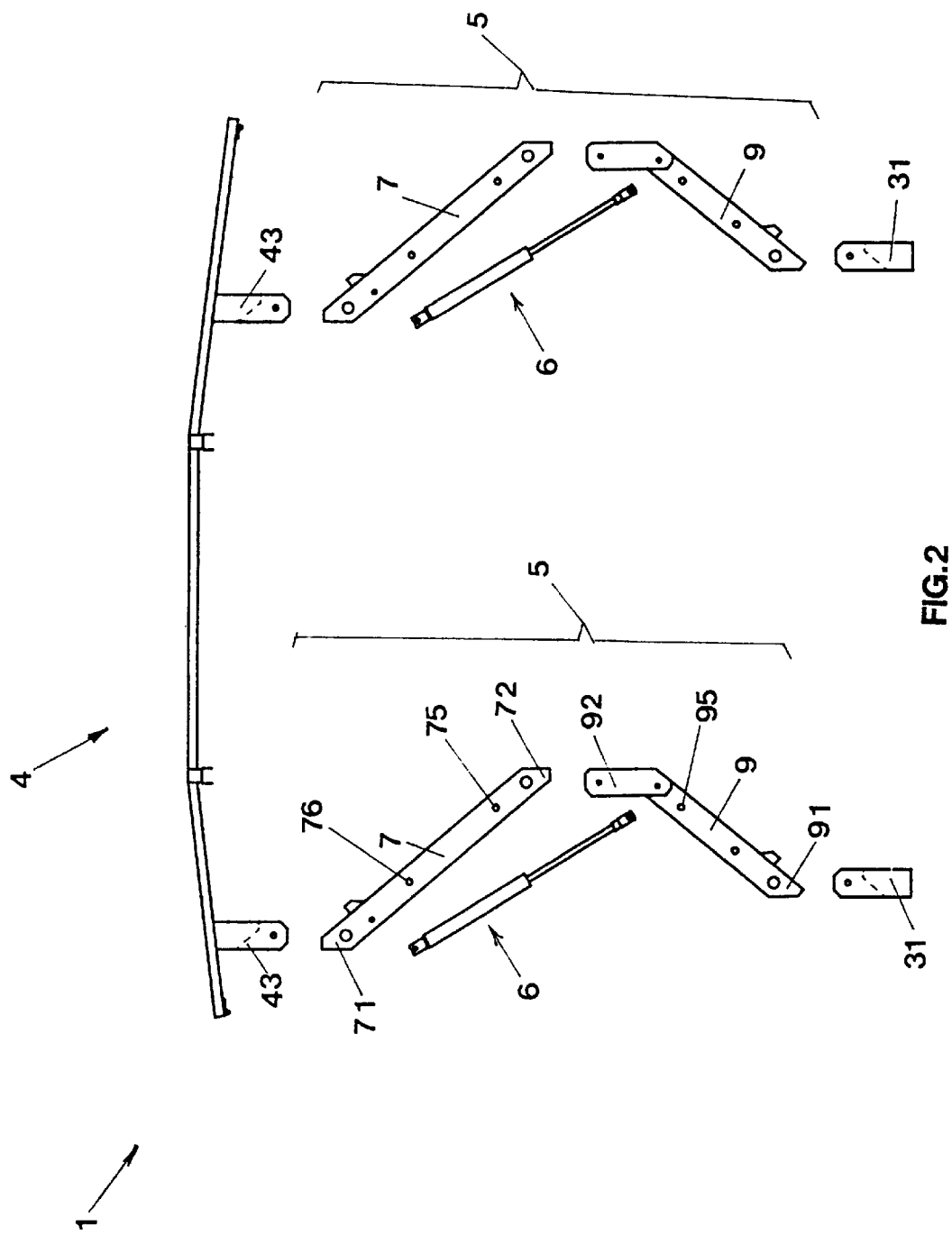
FIG. 2 shows the covering structure of FIG. 1 in an exploded side view.
Figure 3:
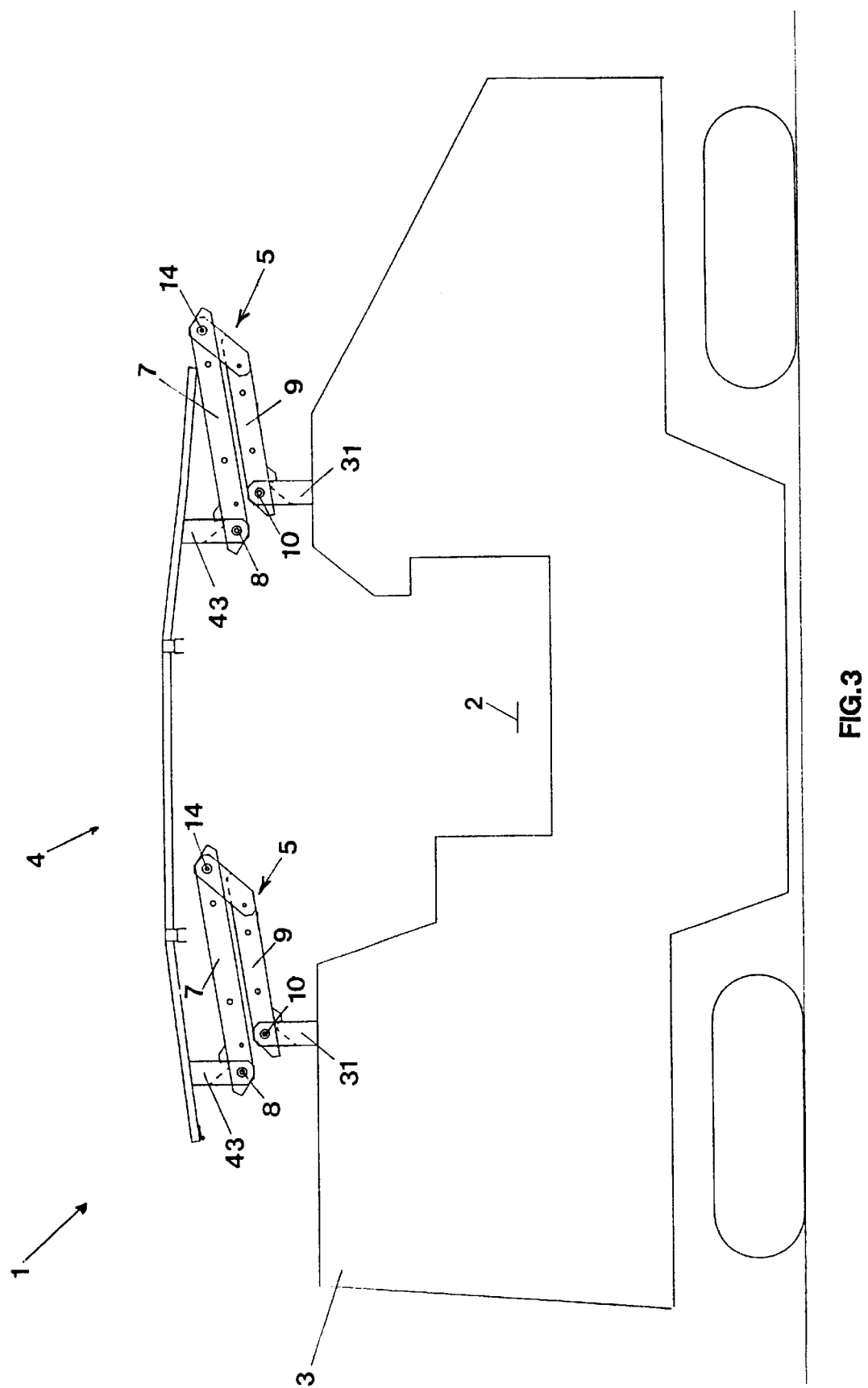

As FIGS. 1 and 2 show, the covering structure of the invention, indicated as a whole with 1, is useful, as FIG. 3 shows, for protecting the driving place 2 of an operative machine for road-works schematically represented and indicated as 3.

It can be observed that said covering structure comprises a canopy 4 which is mounted on the frame of said operative machine 3 by supporting elements indicated as a whole with 5 and shifting means 6 suitable for lifting and lowering it.

Preferably, as in the example represented in the figures and which is described after, said supporting elements 5 and said shifting means 6 are arranged in correspondence with the four angles of said canopy 4 which presents in plan a substantially rectangular shape and it is formed of a frame 41 on which a protecting covering 42 is present.

It is however clear that in different embodiments the canopy could insist on the frame of the operative machine by a different number of supporting elements and shifting means and it could also be realised with a structure different from that described. The FIGS. 1, 2, 3 show that each of said supporting elements indicated as a whole with 5 is formed of an upper rod or brace 7, which presents an extremity 71 connected with a bracket 43 of the canopy 4 by a first pivot 8 and of a lower rod or brace 9 which presents an extremity 91 pivoted to the supporting bracket 31 of the frame of said machine 3 by a second pivot 10. Besides, said rods present the further extremities respectively 72 and 92, fulcred to one another by a third pivot 14.

In between said upper rod 3 and said lower rod 9 each of said supporting means 6 which is formed of an hydraulic cylinder which presents the body 61 fulcred to said upper rod 7 in between said elements which form it and the extremity of the stem 62 pivoted to said lower rod 9, is interposed.

It can be observed that the extremity 92 of the lower rod 9 is inclined in order to permit to the respected upper and lower 7 and 9 to arrange themselves in a parallel position and overlapped when the canopy is lowered as FIG. 3 shows.

Figure 5:
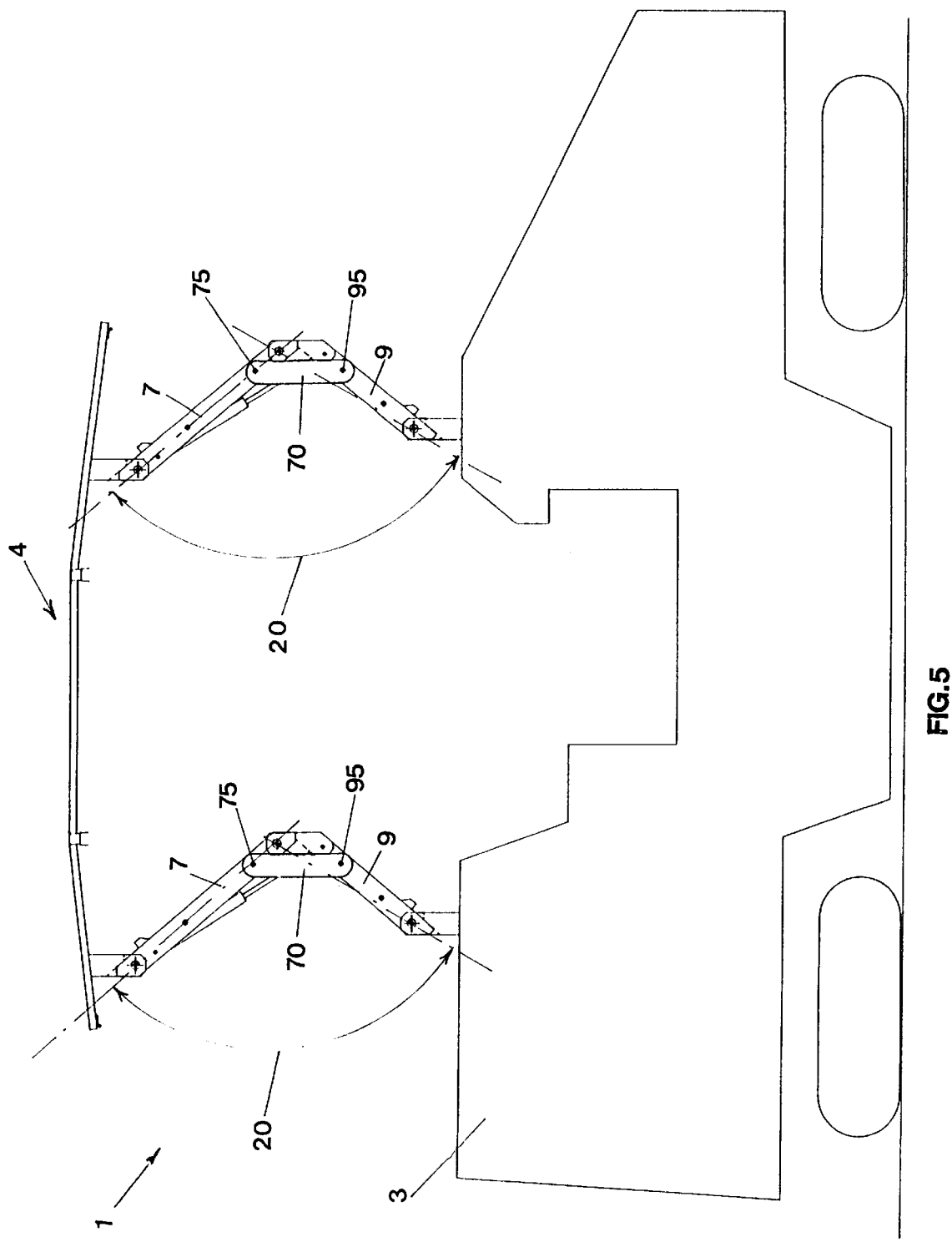
FIG. 5 shows the covering structure of FIG. 4 after the lifting of the canopy.

Vice-versa when the canopy is lifted, as FIG. 5 shows, in between the stakes 75 and 95 respectively of each upper rod 7 and of each lower rod 9, a strut 70 which is a security element suitable for preventing the accidental lowering of the canopy itself, is interposed.

FIG. 1 shows that said strut 70, when in a rest position, is coupled with the stakes 75 and 76 of the upper rod 7.

It is however clear that in different embodiments the security function could be executed by any other mechanic member instead that by a strut 70.

Also with regard to the shifting means 6, which in the case that is described are formed, each of them, by an hydraulic cylinder, could be replaced for example by pneumatic cylinders and the way of application to the rods could be different from that described because, for example, the extremity of the stem 62, instead of being fixed to the lower rod 9 could be fixed to the upper rod 7 and similarly the body 61 could be connected with the lower -rod 9 instead that with the upper rod 7.

The hydraulic cylinder 6 for the lifting of the canopy is a hydraulic single-acting cylinder which is activated by a pressurised oil circuit which comprises a gearcase supplied with a tank and a pump belonging to the known technique. When the covering structure is in a lowered position, it presents itself as FIG. 3 shows, in which the upper and lower braces 7 and 9 which form each supporting element 5, are arranged parallel to one another and overlapped.

Figure 4:
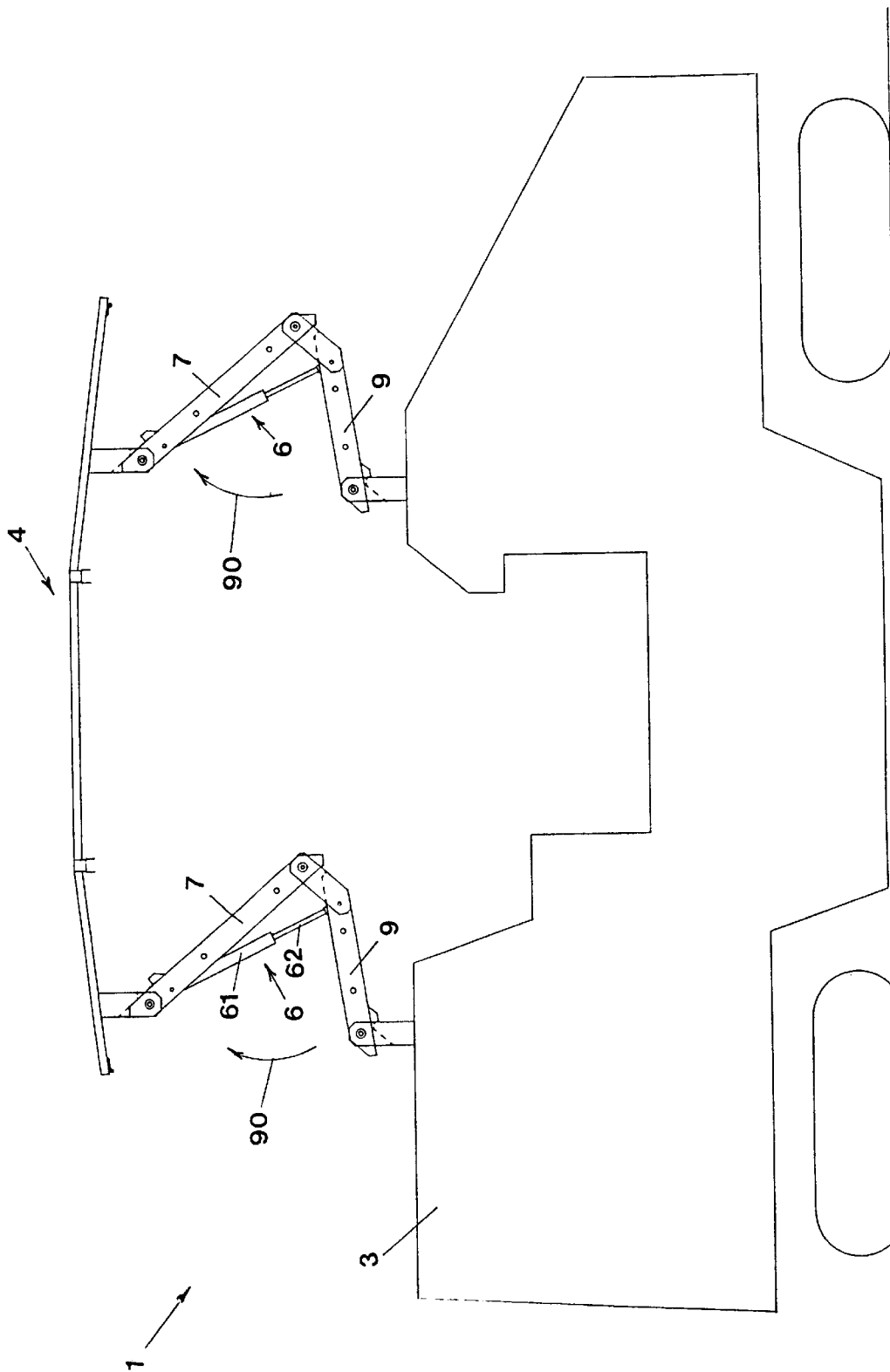
FIG. 4 shows the covering structure of FIG. 3 during the phase of lifting of the canopy.

Activating by a suitable commanding device which can be arranged in correspondence with the driving place 2 or also outside on the frame of the machine 3, the hydraulic cylinders 6 are fed by pressurised oil and the thrust they create causes the compass opening of the braces 7 and 9 according to the clockwise rotating direction 90 as FIG. 4 shows, obtaining the lifting of the canopy 4 which from the lowered position of FIG. 3, passes through the intermediate position 4 in order to arrive to the operative position of FIG. 5 in which it is completely lifted.

It can be observed that in a completely lifted position of the canopy 4, the traces 7 and 9 form with one another an angle 20 with an amplitude smaller than 180° which means that they are not aligned on the same vertical and this favours the lowering of the canopy 4, when the oil is drained from the cylinders 6 in order to make the stem to retract. In such a case the weight of the canopy 4 and of the braces 7 and 9 and definitely of all the covering structure 1, contributes to the draining of the oil from the cylinders and therefore to the lowering of the canopy 4 and to the compass folding of the braces 7 and 9 which, being arranged, as it has been said, in an angular position, are already in a position favourable to the folding.

As it happens in the embodiments belonging to the known technique, the danger that, during the lowering of the canopy, it inclines itself and forces against the supporting elements, blocking itself, is this way avoided.

It is possible to comprehend therefore that the opening, lifting and lowering manoeuvres of the canopy result very simple, sure and first of all practicable from each outer point of the machine where a suitable aerification command of the cylindrical circuit which increases the lifting cylinders, is arranged.

As an alternative the cylinders 6 rather than single-acting, could be double - acting, and in this case the canopy could be commanded not only for lifting but also for lowering, being this last manoeuvre favoured by the angular arrangement of the traces 7 and 9.

In the executive phase, as it has just been said, the rods which form the supporting elements of the canopy, the hydraulic cylinders which form the lifting and the lowering means and the canopy, could be realised with embodiments different from those described.

Figure 6:
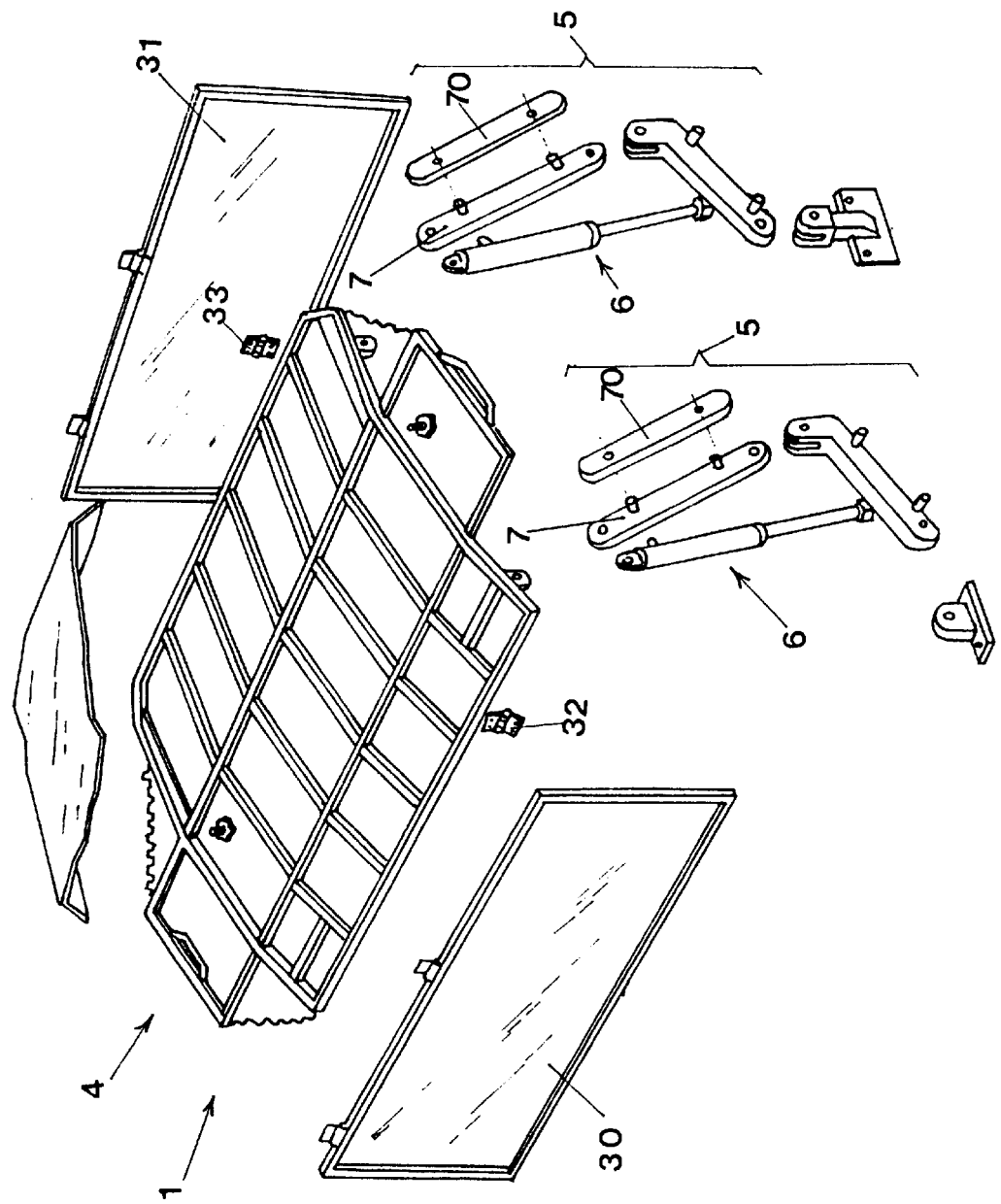
FIG. 6 shows the covering structure of FIG. 1 with the canopy provided with front and rear guards.

This way, for example as FIG. 6 shows, the covering structure could be even supplied with front and rear guards respectively 30 and 31 which are hooked on the canopy 4 by hinges 32 and 33 which permit to lift and lower them at pleasure of the utilizer.

Further variants not represented, based on the same idea of solution described, are all to be considered protected by the present patent.

What is claimed is:

1. A cover for the driver location of a mobile machine comprising:
 a canopy;
 a frame for receiving the canopy thereon;
 a plurality of supporting elements for supporting the frame on the machine;

shifting means engaging each of the supporting elements for raising and lowering the frame between a lockable raised position and a lowered position, wherein each of the supporting elements includes a pair of rods actuable by at least one of said shifting means, said rods being disposed with respect to each other at fixed angle of less than 180° when the canopy is in the raised position; and a security strut for engaging at least one of the pair of rods for lockably securing the canopy in the raised position.

2. The covering structure according to the claim 1 wherein each of said cylinders comprises a double acting hydraulic cylinder.

3. The cover of claim 1 wherein each of the supporting elements comprises an upper rod and lower rod each having respective first and second ends, the upper rod having its first end rotatably coupled to the frame and the second end coupled to the first end of the lower rod, the second end of the lower rod being rotatably securable to the machine and said shifting means being coupled between the upper and lower rods.

4. The covering of claim 1, wherein each of the shifting means includes a hydraulic cylinder having first and second ends, one each coupled to the upper and lower rods.

5. The covering of claim 1, further including at least one window hinged to the canopy.

6. A cover for the driver location as claimed in claim 1, wherein the rods have proximal end portions for engaging the canopy and the frame and distal portions engaging each other to limit the upper position of the canopy.

* * * * *